(12) United States Patent
Min (10) Patent No.: US 11,708,118 B2
(45) Date of Patent: Jul. 25, 2023

(54) RUNNING BARE CHASSIS ASSEMBLY FOR LOW-FLOOR BUS AND MANUFACTURING METHOD THEREOF

(71) Applicants: Hyundai Motor Company, Seoul (KR); Kia Corporation, Seoul (KR)

(72) Inventor: Byung-Ha Min, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 137 days.

(21) Appl. No.: 17/335,267

(22) Filed: Jun. 1, 2021

(65) Prior Publication Data
US 2022/0227430 A1 Jul. 21, 2022

(30) Foreign Application Priority Data

Jan. 20, 2021 (KR) .................. 10-2021-0008131

(51) Int. Cl.
| | |
|---|---|
| *B62D 31/02* | (2006.01) |
| *B62D 25/20* | (2006.01) |
| *B62D 25/08* | (2006.01) |
| *B62D 27/06* | (2006.01) |
| *B60K 1/04* | (2019.01) |

(52) U.S. Cl.
CPC .............. *B62D 31/02* (2013.01); *B60K 1/04* (2013.01); *B62D 25/084* (2013.01);
(Continued)

(58) Field of Classification Search
CPC .. B62D 31/02; B62D 31/025; B62D 25/2054; B62D 25/2018; B62D 25/2027;
(Continued)

(56) References Cited

U.S. PATENT DOCUMENTS

| | | | | |
|---|---|---|---|---|
| 3,989,119 A | * | 11/1976 | Cady .................. | B60K 5/02 |
| | | | | 180/54.1 |
| 4,881,756 A | * | 11/1989 | Kumasaka ............ | B62D 65/04 |
| | | | | 296/193.03 |

(Continued)

FOREIGN PATENT DOCUMENTS

| | | | | |
|---|---|---|---|---|
| CA | 3033260 A1 | * | 4/2020 | ............... B60K 5/10 |
| CN | 1404451 A | * | 3/2003 | ............. B60G 11/28 |

(Continued)

OTHER PUBLICATIONS

Machine translation of JP-2010036901-A.*
Machine translation of CN-1404451-A.*

*Primary Examiner* — Dennis H Pedder
*Assistant Examiner* — Kevin P Weldon
(74) *Attorney, Agent, or Firm* — Slater Matsil, LLP (57) ABSTRACT

An embodiment running bare chassis assembly includes a front frame on which a front suspension is mounted, a rear frame assembly on which a battery carrier is mounted, wherein the rear frame assembly comprises, a first rear frame on which a rear suspension is mounted, a second rear frame coupled to the first rear frame and on which a radiator is mounted, and a battery carrier frame on which the battery carrier is mounted and which is coupled to the first rear frame through a second engagement, and a center frame coupled to the front frame and the rear frame assembly through a first engagement, wherein a stress distribution due to the first engagement is greater than a stress distribution due to the second engagement.

20 Claims, 12 Drawing Sheets

(52) U.S. Cl.
 CPC ....... *B62D 25/088* (2013.01); *B62D 25/2054* (2013.01); *B62D 27/06* (2013.01); *B60K 2001/0416* (2013.01)

(58) Field of Classification Search
 CPC ...... B62D 27/02; B62D 27/065; B62D 27/03; B60K 2001/0416
 USPC .... 296/178, 187.09, 187.11, 193.01, 193.04, 296/193.08, 193.09
 See application file for complete search history.

(56) References Cited

U.S. PATENT DOCUMENTS

| | | | | |
|---|---|---|---|---|
| 7,425,005 | B2 * | 9/2008 | Smith | B60G 11/15 280/124.135 |
| 2004/0194280 | A1 * | 10/2004 | Borroni-Bird | B23P 19/04 29/469 |
| 2005/0087971 | A1 * | 4/2005 | Studebaker | B62D 21/02 280/781 |
| 2016/0159221 | A1 * | 6/2016 | Chen | B62D 31/025 180/53.8 |
| 2017/0240215 | A1 * | 8/2017 | LaRose | B62D 65/024 |
| 2020/0406982 | A1 * | 12/2020 | Chung | B62D 25/025 |
| 2022/0194489 | A1 * | 6/2022 | Roche | B60K 1/00 |
| 2022/0242491 | A1 * | 8/2022 | Woo | B62D 21/03 |
| 2022/0348277 | A1 * | 11/2022 | Harmon | B60K 1/00 |

FOREIGN PATENT DOCUMENTS

| | | | | |
|---|---|---|---|---|
| CN | 201183525 Y | * | 1/2009 | |
| JP | H11120975 A | * | 4/1999 | |
| JP | 2006044400 A | * | 2/2006 | |
| JP | 2010036901 A | * | 2/2010 | ............... B60K 1/04 |
| KR | 101392443 B1 | | 5/2014 | |

* cited by examiner

RUNNING BARE CHASSIS ASSEMBLY FOR LOW-FLOOR BUS AND MANUFACTURING METHOD THEREOF

CROSS-REFERENCE TO RELATED APPLICATIONS

This application claims priority to Korean Application No. 10-2021-0008131, filed on Jan. 20, 2021, which application is hereby incorporated herein by reference.

TECHNICAL FIELD

Exemplary embodiments of the present disclosure relate to a running bare chassis assembly for a low-floor bus and a manufacturing method thereof.

BACKGROUND

Electric buses and hydrogen buses are being developed domestically and globally. Among the electric buses and the hydrogen buses, low-floor double-decker electric buses are also under development.

A vehicle is divided into a body and a chassis, and the chassis is formed by assembling a power transmission system, a suspension, and electric vehicle parts to a frame which is a basic frame.

Conventionally, since a body structure of a low-floor bus is formed as a build-up body structure, a body weight is excessive and workability is very disadvantageous.

For example, a conventional ultra-low-floor frame assembly for a compressed natural gas (CNG) engine has a structure in which a front frame is connected to a center frame using a longitudinal member. However, since it is impossible to integrally manufacture the front frame and the center frame and separate the front frame from the center frame, assembling work is impossible and a length of the center frame is not easily changed.

In addition, the conventional ultra-low-floor frame assembly has a structure in which the center frame and a rear frame are connected to the longitudinal member using a connection member. However, since it is also impossible to integrally manufacture the center frame, the rear frame, and the longitudinal member and separate the center frame, the rear frame, and the longitudinal member from each other, assembling work is impossible and a length of the center frame is not easily changed.

In addition, when the build-up body structure is applied, a capacity of a three-axis air spring of a double-decker electric bus may not be satisfied. The capacity of the three-axis air spring of the double-decker electric bus is less than or equal to 6,700 kg.

The contents described in the Background are to aid understanding of the background of the present disclosure and may include what is not previously known to those skilled in the art to which the present disclosure pertains.

SUMMARY

An embodiment of the present disclosure is directed to a running bare chassis assembly for a low-floor bus, which is not excessive in weight and has excellent manufacturing workability, and a manufacturing method thereof.

Other objects and advantages of embodiments of the present disclosure can be understood by the following description and become apparent with reference to the embodiments of the present disclosure. Also, it is obvious to those skilled in the art to which the present disclosure pertains that the objects and advantages of embodiments of the present disclosure can be realized by the means as claimed and combinations thereof.

In accordance with an embodiment of the present disclosure, there is provided a running bare chassis assembly for a low-floor bus, which includes a front frame on which a front suspension is mounted, a rear frame assembly on which a battery carrier is mounted, and a center frame coupled to the front frame and the rear frame assembly through a first engagement, wherein the rear frame assembly includes a first rear frame on which a rear suspension is mounted, a second rear frame which is coupled to the first rear frame and on which a radiator is mounted, and a battery carrier frame on which the battery carrier is mounted and which is coupled to the first rear frame through a second engagement, and a stress distribution due to the first engagement is greater than a stress distribution due to the second engagement.

In addition, the running bare chassis assembly may further include a center bridge connected between the front frame and the rear frame assembly.

In addition, the front frame may include a front suspension mounting portion on which the front suspension is mounted, and an air tank mounting portion formed on the front frame to allow an air tank to be mounted above the front frame.

In addition, the center frame may be formed such that lengthwise frames formed and disposed to be spaced apart from each other in a lengthwise direction of the center frame, and widthwise frames formed and disposed to be spaced apart from each other in a width direction of the center frame are formed in a grid structure.

In addition, the first rear frame may include a lower frame which forms a lower portion and on which the rear suspension is mounted, and an upper frame forming an upper portion, wherein the upper frame may be formed such that a first upper frame formed and disposed to be spaced apart from each other in a lengthwise direction of the first rear frame, and a second upper frame formed and disposed to be spaced apart from each other in a width direction of the first rear frame are formed in a grid structure.

In addition, the second rear frame may be formed of a grid-shaped low-floor frame forming the lower surface, and a plurality of vertical frames formed vertically upward from the low-floor frame.

In addition, each of upper ends of the plurality of vertical frames may be coupled to a lower end of the first rear frame through the first engagement.

In addition, a module upper side engagement portion, which protrudes downward, may be formed in the first upper frame to be bolt-coupled to a radiator upper side engagement portion above the radiator, and a module lower side engagement portion, which protrudes upward, may be formed in the low-floor frame to be bolt-coupled to a radiator lower side engagement portion below the radiator.

In addition, the module upper side engagement portion and the radiator upper side engagement portion may be coupled by a bolt passing through the rear frame assembly in a width direction thereof, and the module lower side engagement portion and the radiator lower side engagement portion may be coupled by a bolt passing through the rear frame assembly in a height direction thereof.

Meanwhile, a plate-shaped forklift mounting guide, which extends in a width direction of the battery carrier frame, may be formed in a lower end portion of the battery carrier frame.

In addition, a guide plate may be coupled to the second upper frame so as to extend in a lengthwise direction of the second upper frame and to protrude upward from the second upper frame.

In addition, a stopper may be coupled to the first upper frame so as to protrude upward from the first upper frame, and a guide pin seated on the first upper frame may be coupled to one side of the stopper.

In addition, the first engagement may be a welding engagement method, and the second engagement may be a bolting engagement method.

In addition, the front suspension may be an independent suspension, and the rear suspension may be a rigid axle.

Next, a manufacturing method of a running bare chassis assembly for a low-floor bus includes manufacturing a front frame on which a front suspension is mounted, manufacturing a rear frame assembly including coupling a second rear frame on which a radiator is mounted to a first rear frame on which a rear suspension is mounted through a first engagement and coupling a battery carrier frame on which a battery carrier is mounted to the first rear frame through a second engagement, manufacturing a center frame configured to connect the front frame to the rear frame assembly, and coupling the front frame, the rear frame assembly, and the center frame through the first engagement, wherein a stress distribution due to the first engagement is greater than a stress distribution due to the second engagement.

In addition, the manufacturing method may further include connecting a center bridge between the front frame and the rear frame assembly.

In addition, the first engagement may be a welding engagement method, and the second engagement may be a bolting engagement method.

In addition, a front suspension may be an independent suspension, and a rear suspension may be a rigid axle.

DETAILED DESCRIPTION OF ILLUSTRATIVE EMBODIMENTS

Reference should be made to the accompanying drawings that illustrate exemplary embodiments of the present disclosure and to the description in the accompanying drawings in order to fully understand the present disclosure and operational advantages of embodiments of the present disclosure and objects attained by practicing embodiments of the present disclosure.

In describing exemplary embodiments of the present disclosure, known technologies or repeated descriptions may be reduced or omitted to avoid unnecessarily obscuring the gist of the present disclosure.

Figure 1:
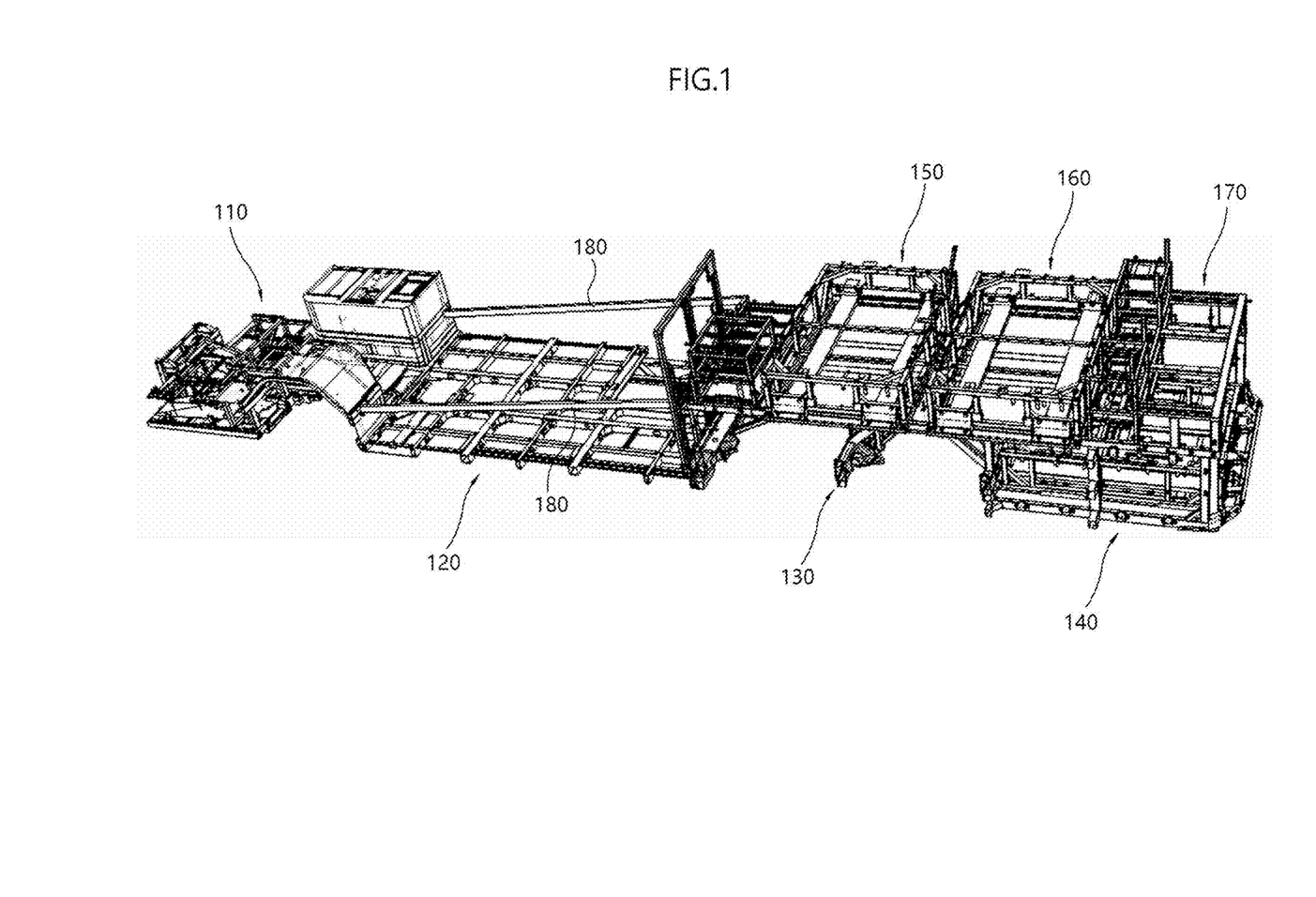
FIG. 1 is a diagram illustrating a running bare chassis assembly for a low-floor bus according to embodiments of the present disclosure.

FIG. 1 is a diagram illustrating a running bare chassis assembly for a low-floor bus according to embodiments of the present disclosure, and FIGS. 2 to 5 are diagrams illustrating a coupling relationship between portions of the running bare chassis assembly for a low-floor bus according to embodiments of the present disclosure.

Hereinafter, a running bare chassis assembly for a low-floor bus and a manufacturing method of a running bare chassis assembly according to one embodiment of the present disclosure will be described with reference to FIGS. 1 to 5.

Embodiments of the present disclosure relate to a running bare chassis assembly of a low-floor bus, for example, a double-decker electric bus, and relate to minimizing an overall weight and improving assemblability by separately manufacturing a front frame 110, a center frame 120, and a rear frame assembly and then coupling the front frame 110, the center frame 120, and the rear frame assembly.

The front frame 110 is a chassis module corresponding to a front side of the low-floor bus and has a structure on which an independent suspension and an air tank are mounted.

The rear frame assembly is a chassis model corresponding to a rear side of the low-floor bus, to which a first rear frame 130, a second rear frame 140, a first battery carrier frame 150, a second battery carrier frame 160, and an air conditioner mounting frame 170 are coupled, and has a structure on which an in-wheel motor, a low-floor rigid axle, a PE room, a battery carrier, and the like are mounted.

In addition, the center frame 120 may be connected between the front frame 110 and the rear frame assembly, and a center bridge 180 may be connected between the front frame 110 and the rear frame assembly to prevent deformation during driving.

That is, the center frame 120 is connected to a lower end of a rear side of the front frame 110 and connected to a lower end of a front side of the rear frame assembly.

Figure 2:
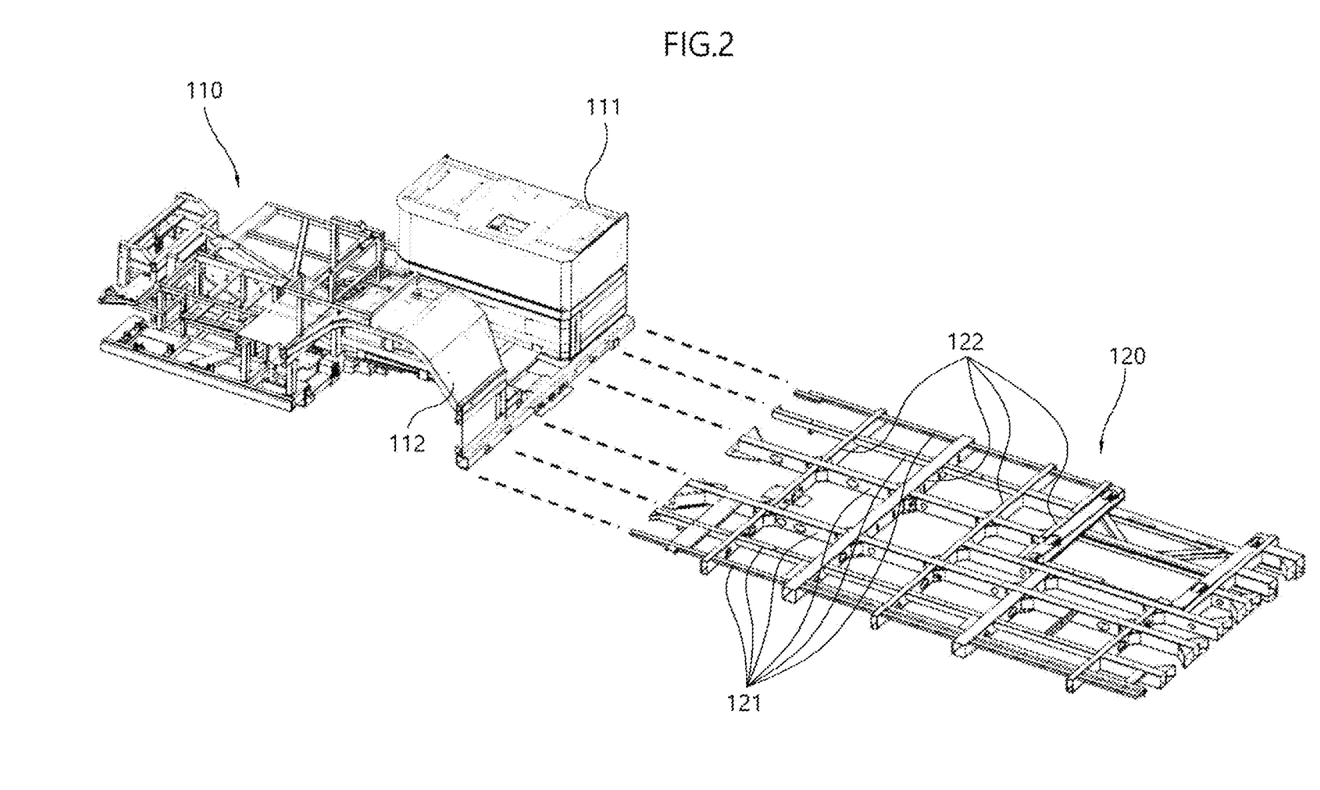
FIGS. 2 to 5 are diagrams illustrating a coupling relationship between portions of the running bare chassis assembly for a low-floor bus according to embodiments of the present disclosure.

As shown in FIG. 2, an air tank mounting portion 111 and a front suspension mounting portion 112 are formed on the front frame 110, and an air tank and a front suspension are mounted on the air tank mounting portion 111 and the front suspension mounting portion 112, respectively. The front suspension mounting portion 112 has an arch-shaped structure, and the air tank mounting portion 111 is formed in a hexahedral shape on an upper side of the front frame 110. The front suspension may be an independent suspension.

The center frame 120 is formed in a structure in which lengthwise frames 121 are disposed to be spaced apart from each other in a lengthwise direction of a bare chassis, and widthwise frames 122 are disposed to be spaced apart from each other in a width direction of the bare chassis.

The lower end of the rear side of the front frame 110 and the front side of the center frame 120, that is, a front side of the lengthwise frame 121, are coupled by welding which is a first engagement method.

Since the connection between the front frame 100 and the center frame 120 is a connection between main members which are subjected to high stress, the front frame 110 and the center frame 120 are members which are coupled by welding so as to distribute stress. This welding is possible since the members do not need be separated in the field after the welding, e.g., for maintenance. Such a stress distribution due to the first engagement method is greater than a stress distribution due to a second engagement method which will be described below.

A conventional ultra-low-floor frame assembly for a compressed natural gas (CNG) engine has a structure in which a front frame is connected to a center frame using a longitudinal member. However, since it is impossible to integrally manufacture the front frame and the center frame and separate the front frame from the center frame, assembling work is impossible and a length of the center frame is not easily changed.

However, according to embodiments of the present disclosure, it is achieved a structure in which the front suspension is capable of being mounted with only the front frame 110 of embodiments of the present disclosure. In addition, such a structure is also applicable to 13M electric vehicles, 18M electric vehicles, hydrogen vehicles, and the like.

In addition, since a workspace is reduced and a work range is simplified, workability is more advantageous when the front suspension is assembled.

In addition, the conventional ultra-low-floor frame assembly for a CNG engine has a structure in which the center frame and a rear frame are connected to the longitudinal member using a connection member. However, since it is also impossible to integrally manufacture the center frame, the rear frame, and the longitudinal member and separate the center frame, the rear frame, and the longitudinal member from each other, assembling work is impossible and a length of the center frame is not easily changed.

However, the center frame 120 according to embodiments of the present disclosure has a structure which has an advantage of being easily changed in length. In addition, the center frame 120 is also applicable to 13M electric vehicles, 18M electric vehicles, hydrogen vehicles, and the like.

That is, in consideration of a stress measurement result which will be described below, it is possible to set a length of the center frame 120 by separating or extending the widthwise frame 122.

Figure 3:
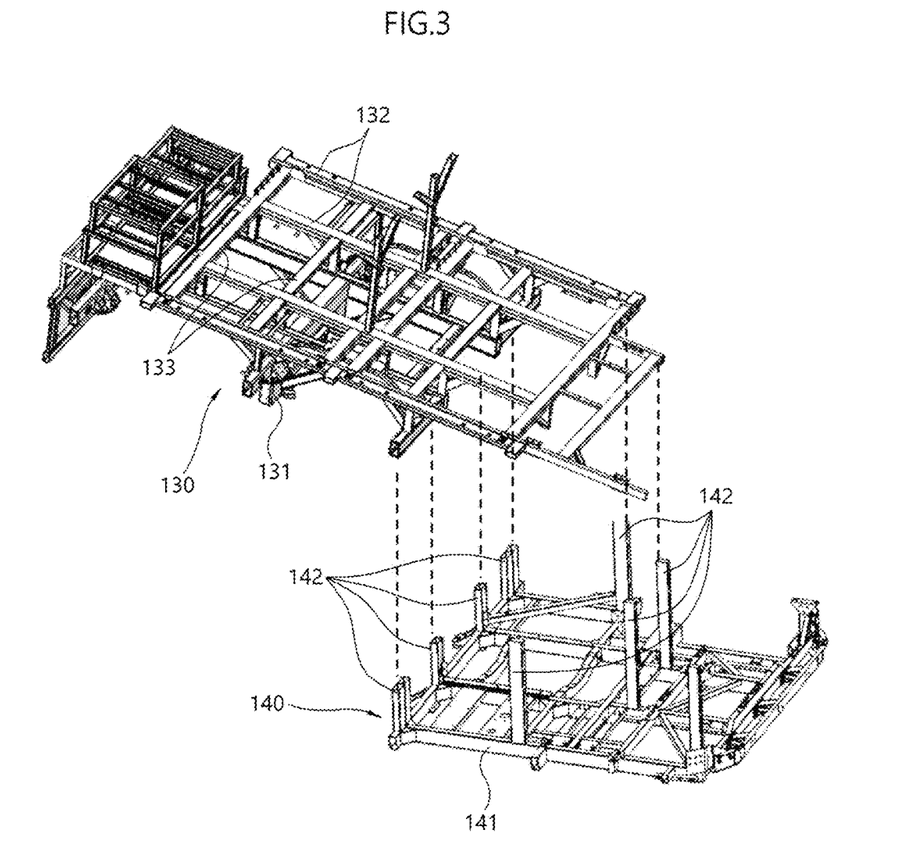
Figure 4:
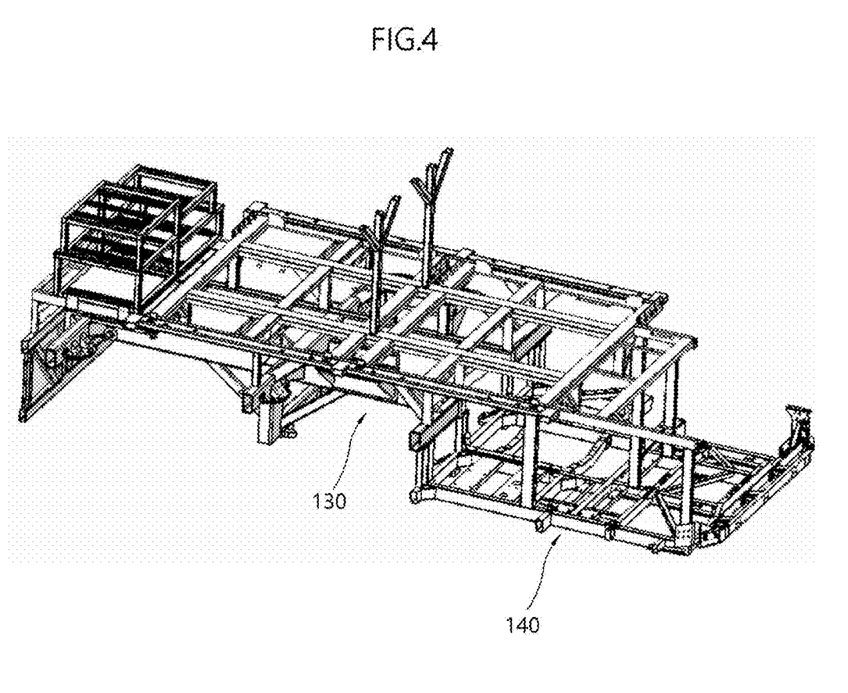
Figure 5:
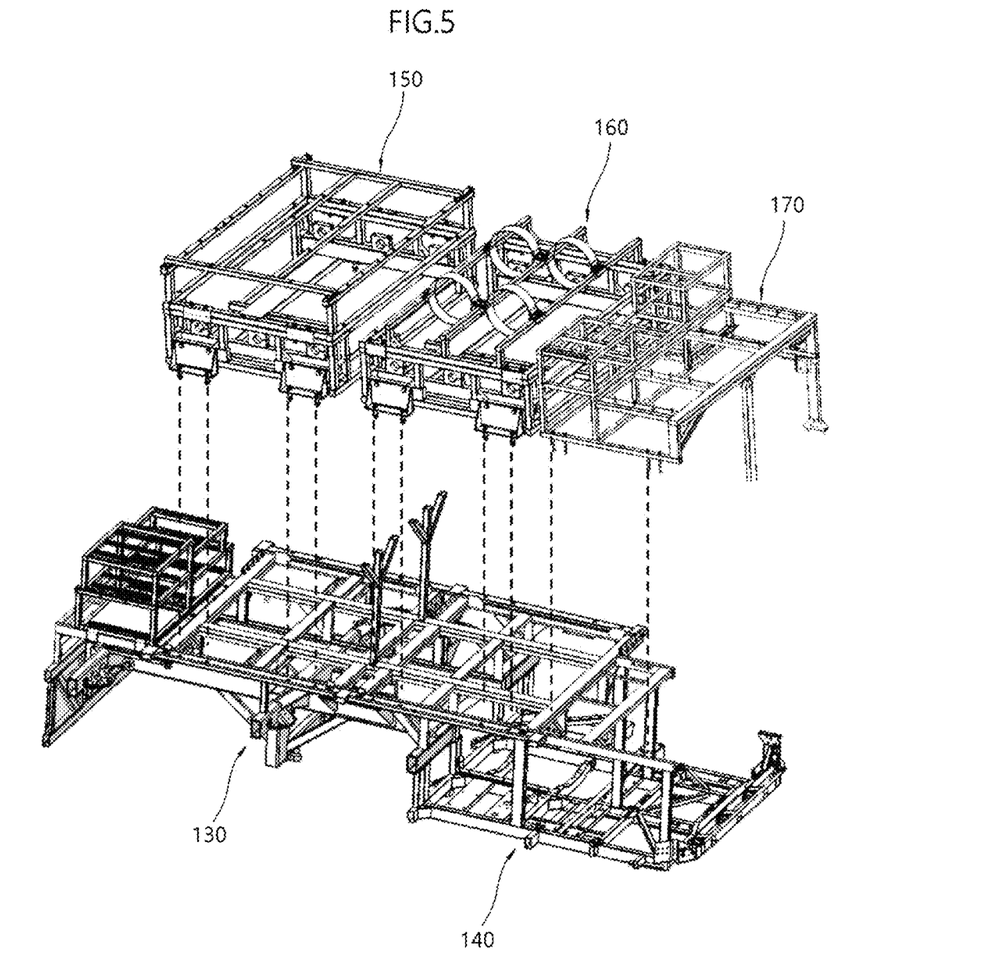

Next, FIGS. 3 to 5 illustrate a coupling relationship of the rear frame assembly.

Referring to FIG. 3, the first rear frame 130 and the second rear frame 140 may be coupled first.

The first rear frame 130 forms a lower portion, and an in-wheel motor and a low-floor rigid axle, as an example of a rear suspension, are mounted on the first rear frame 130. To this end, the first rear frame 130 is formed of a lower frame 131 including an arch-shaped structure and an upper frame forming an upper portion, and the upper frame is formed in a shape in which first upper frames 132 and second upper frames 133 are formed in a grid shape.

That is, the upper frame is formed in a structure in which the first upper frames 132 are disposed to be spaced apart from each other in the lengthwise direction of the bare chassis, and the second upper frames 133 are disposed to be spaced apart from each other in the width direction of the bare chassis.

The second rear frame 140 is formed of grid-shaped low-floor frames 141 forming a lower surface and a plurality of vertical frames 142 vertically formed upward from the low-floor frames 141.

Thus, as shown in FIG. 4, an upper end of the vertical frame 142 of the second rear frame 140 may be coupled to the first rear frame 130 and may be coupled to a lower end of the lower frame 131 of the first rear frame 130 or coupled to a point at which the first upper frame 132 and the second upper frame 133 intersect.

Since the connection between the first rear frame 130 and the second rear frame 140 is a connection between main members which are subjected to high stress, the first rear frame 130 and the second rear frame 140 are members that are coupled by welding, which is the first engagement method, so as to distribute stress. This connection is possible since the members need not to be separated in the field after the welding for maintenance.

Next, as shown in FIG. 5, the first battery carrier frame 150, the second battery carrier frame 160, and the air conditioner mounting frame 170 are coupled on the first rear frame 130 and the second rear frame 140 which are coupled.

The first battery carrier frame 150 and the second battery carrier frame 160 are formed of frames capable of accommodating components of a battery carrier, and an air conditioner is mounted on the air conditioner mounting frame 170.

In addition, lower ends of the first battery carrier frame 150, the second battery carrier frame 160, and the air conditioner mounting frame 170 are coupled to an upper end of the first rear frame 130 through bolting which is the second engagement method, thereby complementing the rear frame assembly. Thereafter, the lower end of the front side of the rear frame assembly is welded to a rear end of the center frame 120.

The coupling between the first battery carrier frame 150, the second battery carrier frame 160, the air conditioner mounting frame 170, and the first rear frame 130 may require battery replacement work or maintenance of the air conditioner in the field, and the coupling is achieved through bolting, thereby facilitating coupling and disassembly.

In addition, positions of bolting and the number of bolts between the first rear frame 130, the first battery carrier frame 150, and the second battery carrier frame 160 may be selected on the basis of the stress analysis result.

Figure 6:
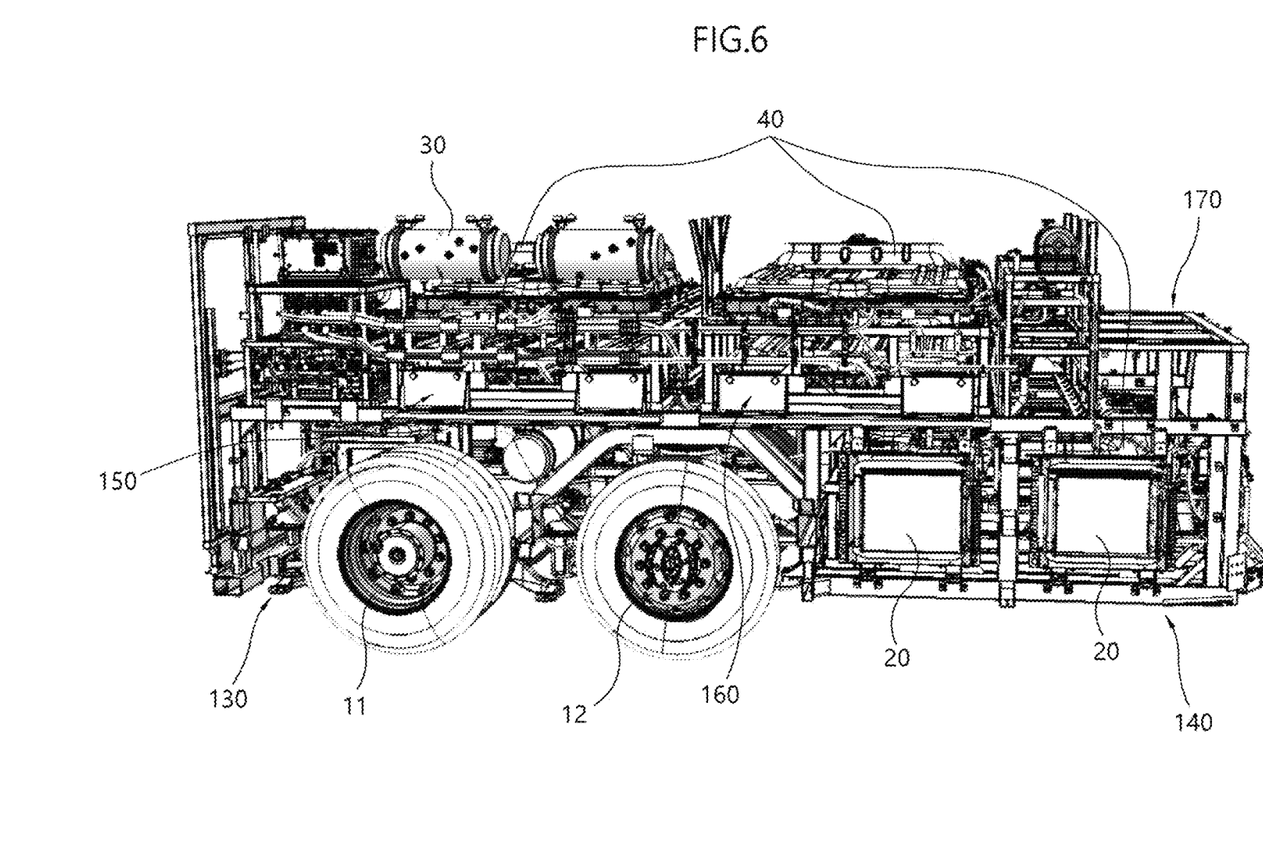
FIG. 6 is a diagram illustrating a state in which various components are mounted on a rear frame assembly of a running bare chassis for a low-floor bus according to embodiments of the present disclosure.
Figure 7:
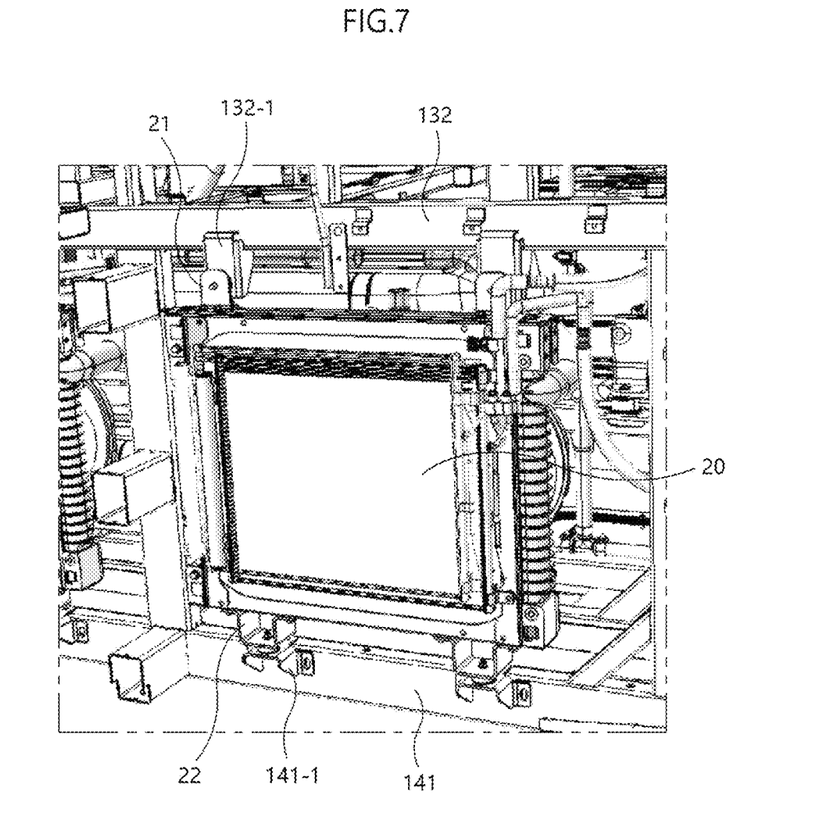
FIG. 7 is a diagram illustrating a part of FIG. 6.

FIG. 6 illustrates a state in which various components are mounted on the completed rear frame assembly, and FIG. 7 illustrates a part of FIG. 6.

As shown in FIG. 6, a wheel motor axle 11 and a low-floor rigid axle 12 are mounted on the lower frame 131 of the first rear frame 130, and a radiator (cooling system) and a battery carrier 40 are mounted on the second rear frame 140.

In addition, an air tank 30 and the battery carrier 40 are mounted on the first battery carrier frame 150 and the second battery carrier frame 160.

As described above, the battery carrier 40, the low-floor rigid axle 12, the radiator, and the air tank 30 may be assembled to the rear frame assembly, and thus the rear frame assembly may be extended and applied to other derivative vehicles.

Meanwhile, according to a related art, a radiator is mounted on a frame and a side panel, whereas according to embodiments of the present disclosure, the radiator is configured to be mounted on only the frame.

In addition, according to embodiments of the present disclosure, as shown in FIG. 7, a module upper side engagement portion 132-1 protruding downward is formed on the first upper frame 132 of the first rear frame 130 and bolt-coupled to a radiator upper side engagement portion 21 above a radiator 20, and a module lower side engagement portion 141-1 protruding upward is formed on a low-floor frame 141 of the second rear frame 140 and bolt-coupled to a radiator lower side engagement portion 22 below the radiator 20.

In particular, a bolt for connecting the module upper side engagement portion 132-1 to the radiator upper side engagement portion 21 is formed to pass through and couple the module upper side engagement portion 132-1 and the radiator upper side engagement portion 21 in the width direction of the bare chassis, and a bolt for connecting the module lower side engagement portion 141-1 to the radiator lower side engagement portion 22 is formed to pass through and couple the module lower side engagement portion 141-1 and the radiator lower side engagement portion 22 in a height direction of the bare chassis, thereby being capable of minimizing a vibration of a fan of the radiator 20.

Figure 8:
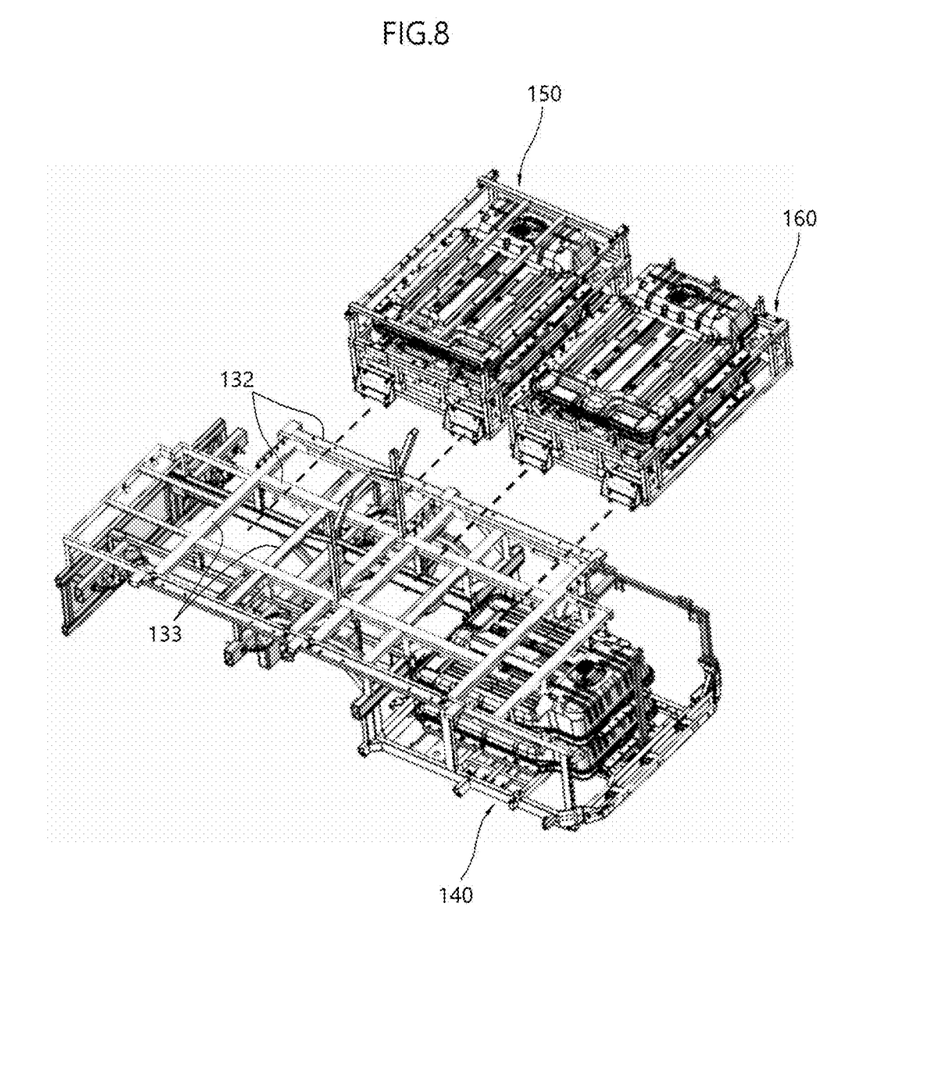
FIG. 8 is a diagram illustrating a coupling relationship between portions of the running bare chassis assembly for a low-floor bus according to embodiments of the present disclosure.

Meanwhile, the first battery carrier frame 150 and the second battery carrier frame 160 are bolt-coupled to the upper end of the first rear frame 130. As shown in FIG. 8, in order to arrange the first battery carrier frame 150 and the second battery carrier frame 160 on an upper side of the first rear frame 130 or facilitate separation of the first battery carrier frame 150 and the second battery carrier frame 160 from the upper side of the first rear frame 130, the first battery carrier frame 150 and the second battery carrier frame 160 are put into the upper side of the first rear frame 130 from a lateral direction thereof.

Figure 9:
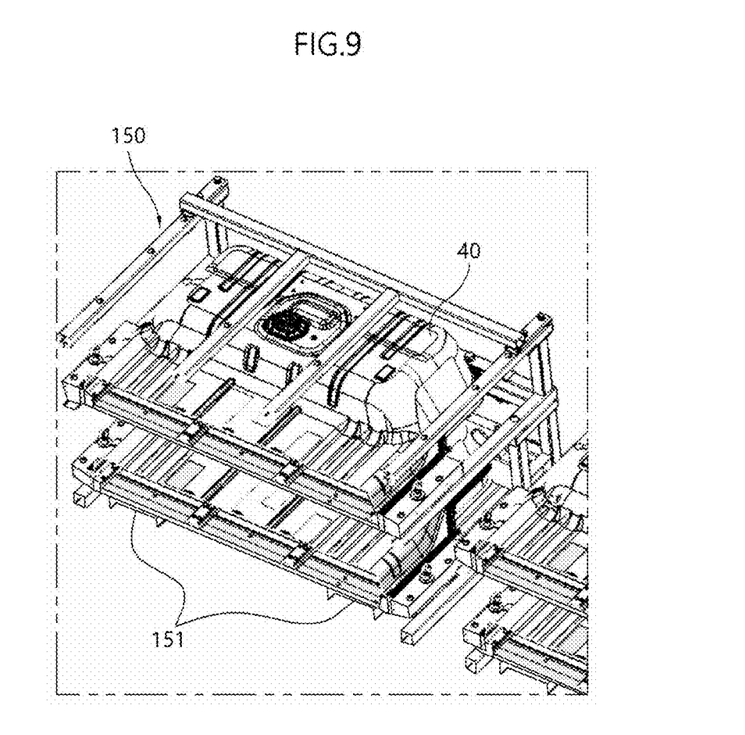
FIG. 9 is a diagram illustrating a partial cross-sectional shape of a battery carrier frame of the running bare chassis for a low-floor bus according to embodiments of the present disclosure.

As shown in FIG. 9, a forklift mounting guide 151 is formed in a lower end portion of the first battery carrier frame 150 and a lower end portion of the second battery carrier frame 160 so as to allow transportation of the first battery carrier frame 150 and the second battery carrier frame 160 by a forklift. That is, the forklift mounting guide 151 capable of being supported on a clamp of the forklift is formed in the form of a plate in the lower end portions of the first battery carrier frame 150 and the second battery carrier frame 160 in the width direction.

As shown in FIG. 8, the first battery carrier frame 150 and the second battery carrier frame 160 are coupled to the upper end of the first rear frame 130 through bolting which is the second engagement method, thereby complementing the rear frame assembly. Thereafter, the lower end of the front side of the rear frame assembly is welded to the rear end of the center frame 120.

Figure 10:
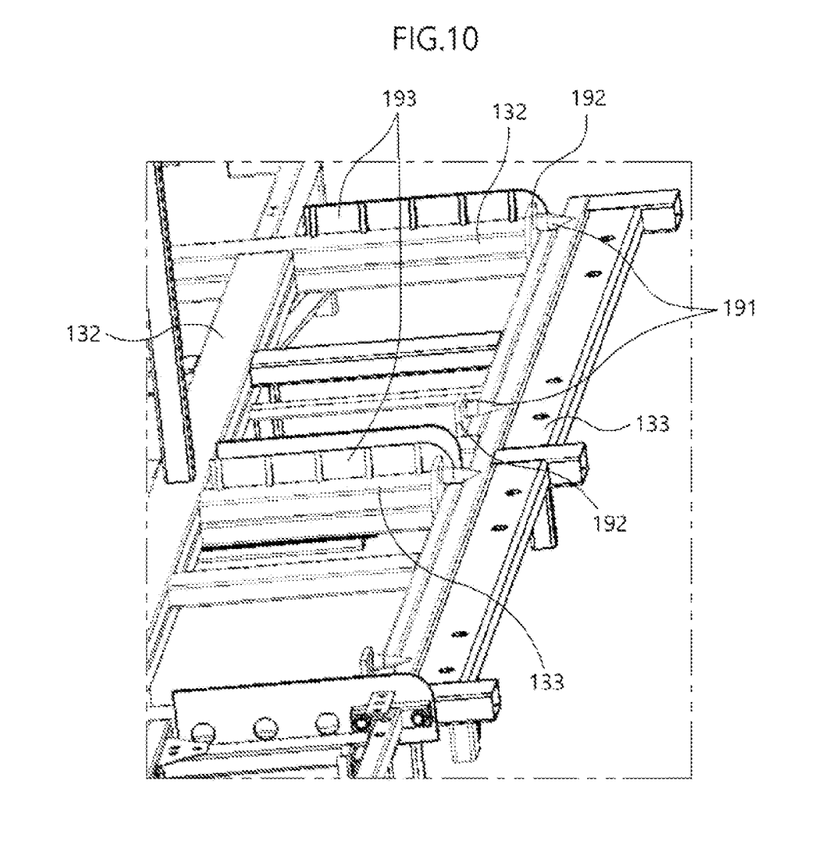
FIG. 10 is a diagram illustrating a partial shape of a first rear frame of the running bare chassis for a low-floor bus according to embodiments the present disclosure.

In addition, guide pins 191, stoppers 192, and a plurality of guide plates 193 are configured to transport the first battery carrier frame 150 and the second battery carrier frame 160 on the first rear frame 130 and locate the first battery carrier frame 150 and the second battery carrier frame 160 at the correct positions on the first rear frame 130.

A lengthwise direction of the guide plate 193 is parallel to a lengthwise direction of the second upper frame 133, and the guide plate 193 is coupled on an upper portion of the second upper frame 133 to protrude upward from the second upper frame 133. Thus, the first battery carrier frame 150 and a front end and a rear end of the second battery carrier frame 160 are guided to be disposed in the plurality of guide plates 193.

In addition, the stoppers 192 are coupled to protrude upward on sides of two first upper frames 132 which are disposed on outer sides among the first upper frames 132. When the first battery carrier frame 150 and the second battery carrier frame 160 are pushed into and transported, the stoppers 192 block the first battery carrier frame 150 and the second battery carrier frame 160 and aid the first rear frame 130 to not be deviated and disposed.

In addition, in order to support the stopper 192, the guide pin 191 is formed to protrude from one side of the stopper 192 to be coupled thereto and to be seated on the first upper frame 132, thereby preventing the stopper 192 from being pushed by the first battery carrier frame 150 and the second battery carrier frame 160 which are being transported.

Figure 11:
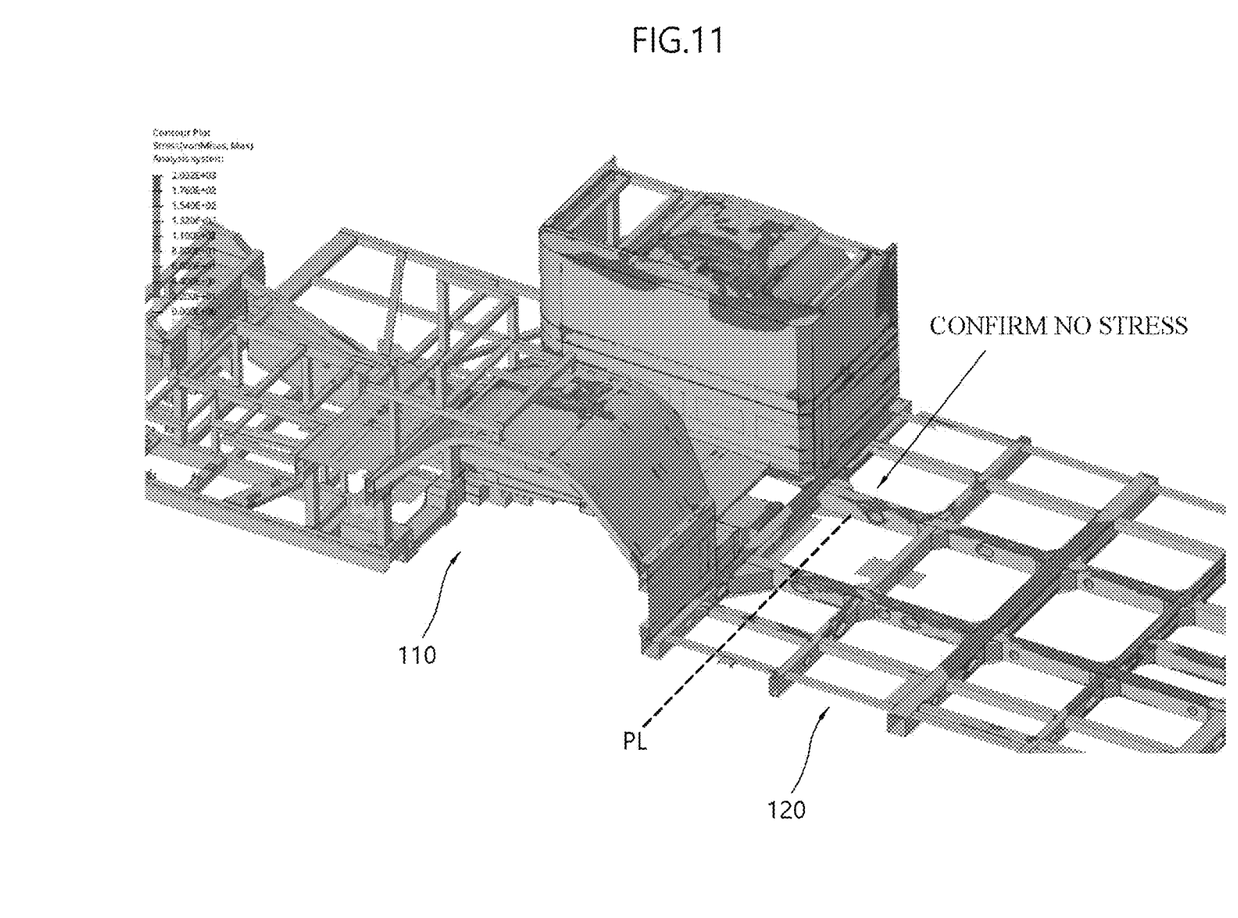
FIGS. 11 and 12 are diagrams illustrating stress analysis results of the running bare chassis for a low-floor bus according to embodiments of the present disclosure.
Figure 12:
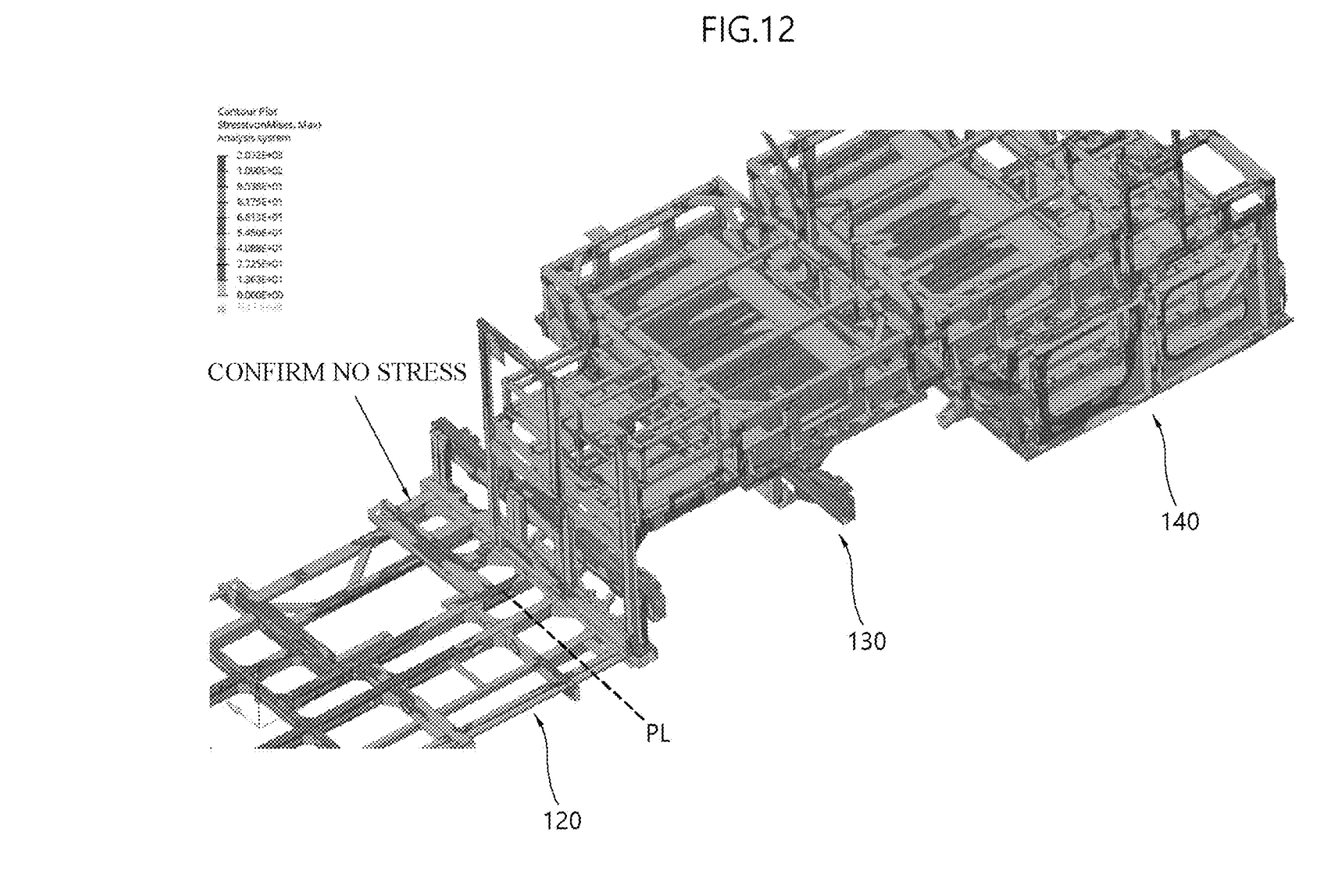

As described above, when compared to the conventional bare chassis, since a weight of the running bare chassis assembly for the low-floor bus according to embodiments of the present disclosure may be reduced, stress concentration may be minimized, and results of stress analysis are shown in FIGS. 11 and 12.

That is, it can be confirmed that, since the stress is largely distributed due to the first engagement method, there is no stress in the vicinity of a portion in which the center frame 120 is coupled to the front frame 110 and the vicinity of a portion in which the center frame 120 is coupled to the rear frame assembly. Thus, the corresponding portions may be determined as parting lines.

In determination of parting lines of the front frame 110, the center frame 120, and the rear frame assembly, it should be considered whether a response is possible without a change when a derivative vehicle is deployed, and it should select a module range in which system assembly is prior to a parting line, respectively and select a portion receiving minimum stress as the parting line.

Through such stress analysis results, it can be seen that the running bare chassis assembly for a low-floor bus according to embodiments of the present disclosure receives less stress when compared to the conventional chassis.

Thus, in the case of the conventional battery carrier frame, a thickness of a cross section ranges from 5.7 mm or 3.2 mm according to portions, whereas a thickness of a cross section of the battery carrier frame according to embodiments of the present disclosure may be changed to 2.3 mm.

In addition, in the case of a lower frame of a conventional rear frame, a thickness of a cross section is 5.7 mm, whereas a thickness of a cross section of the lower frame 131 of the first rear frame 130 according to embodiments of the present disclosure may be changed to 3.2 mm.

In addition, in the case of an upper frame of the conventional rear frame, a thickness of a cross section is 3.2 mm, whereas a thickness of a cross section of the upper frame of the first rear frame 130 according to embodiments of the present disclosure may be changed to 2.3 mm.

In accordance with a structure of a running bare chassis for a low-floor double-decker electric bus according to embodiments of the present disclosure, since an underbody platform is assembled with five modules to manufacture a body module structure of a bare chassis and then electric bus electronic components and a system are assembled, workability can be significantly improved and a weight can be reduced.

In addition, based the improved workability and the reduced weight, the running bare chassis can be additionally applied to various eco-friendly vehicle bare chassis models.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:
1. A chassis assembly, comprising:
a front frame on which a front suspension is mounted;
a rear frame assembly on which a battery carrier is mounted, wherein the rear frame assembly comprises:

a first rear frame on which a rear suspension is mounted;
a second rear frame coupled to the first rear frame and on which a radiator is mounted; and
a battery carrier frame on which the battery carrier is mounted, the battery carrier frame being coupled to the first rear frame through a second engagement;
a center frame coupled to the front frame and the rear frame assembly through a first engagement, wherein stress distribution due to the first engagement is greater than stress distribution due to the second engagement; and
a plate-shaped forklift mounting guide in a lower end portion of the battery carrier frame, the forklift mounting guide extending in a width direction of the battery carrier frame.

2. The chassis assembly of claim 1, further comprising a center bridge connected between the front frame and the rear frame assembly.

3. The chassis assembly of claim 1, wherein the front frame comprises:
a front suspension mounting portion on which the front suspension is mounted; and
an air tank mounting portion formed on the front frame and configured to allow an air tank to be mounted above the front frame.

4. The chassis assembly of claim 1, wherein the center frame comprises a grid structure, wherein the grid structure comprises lengthwise beams formed and disposed to be spaced apart from each other in a lengthwise direction of the center frame and widthwise beams formed and disposed to be spaced apart from each other in a width direction of the center frame.

5. The chassis assembly of claim 1, wherein the first engagement is welded engagement and the second engagement is a bolted engagement.

6. The chassis assembly of claim 1, wherein the front suspension is an independent suspension, and the rear suspension is a rigid axle.

7. A chassis assembly, comprising:
a front frame on which a front suspension is mounted;
a rear frame assembly on which a battery carrier is mounted, wherein the rear frame assembly comprises:
a first rear frame on which a rear suspension is mounted;
a second rear frame coupled to the first rear frame and on which a radiator is mounted;
a battery carrier frame on which the battery carrier is mounted and which is coupled to the first rear frame through a second engagement;
a lower frame forming a lower portion and on which the rear suspension is mounted; and
an upper frame forming an upper portion, wherein the upper frame comprises a grid structure, wherein the grid structure comprises first upper beams spaced apart from each other in a lengthwise direction of the first rear frame and second upper beams spaced apart from each other in a width direction of the first rear frame; and
a center frame coupled to the front frame and the rear frame assembly through a first engagement, wherein a stress distribution due to the first engagement is greater than a stress distribution due to the second engagement.

8. The chassis assembly of claim 7, wherein the second rear frame comprises a grid-shaped low-floor frame and a plurality of vertical frames formed vertically upward from the low-floor frame.

9. The chassis assembly of claim 8, wherein each of upper ends of the plurality of vertical frames is coupled to a lower end of the first rear frame through the first engagement.

10. The chassis assembly of claim 9, wherein:
a module upper side engagement portion, which protrudes downward, is formed in the upper frame and configured to be bolt-coupled to a radiator upper side engagement portion above the radiator; and
a module lower side engagement portion, which protrudes upward, is formed in the low-floor frame and configured to be bolt-coupled to a radiator lower side engagement portion below the radiator.

11. The chassis assembly of claim 10, wherein:
the module upper side engagement portion and the radiator upper side engagement portion are coupled by a bolt passing through the rear frame assembly in a width direction thereof; and
the module lower side engagement portion and the radiator lower side engagement portion are coupled by a bolt passing through the rear frame assembly in a height direction thereof.

12. The chassis assembly of claim 7, wherein a guide plate is coupled to the upper frame, extends in a lengthwise direction of the second upper beams, and protrudes upward from the upper frame.

13. The chassis assembly of claim 12, wherein:
a stopper is coupled to the upper frame and protrudes upward from the upper frame; and
a guide pin seated on the upper frame is coupled to one side of the stopper.

14. The chassis assembly of claim 7, wherein the first engagement is a welding engagement, and the second engagement is a bolting engagement.

15. The chassis assembly of claim 7, wherein the front suspension is an independent suspension, and the rear suspension is a rigid axle.

16. A manufacturing method of a chassis assembly, the manufacturing method comprising:
manufacturing a front frame on which a front suspension is mounted;
manufacturing a rear frame assembly including coupling a second rear frame on which a radiator is mounted to a first rear frame on which a rear suspension is mounted by welding and coupling a battery carrier frame on which a battery carrier is mounted to the first rear frame through a second engagement;
manufacturing a center frame to connect the front frame to the rear frame assembly; and
coupling the front frame, the rear frame assembly, and the center frame through a first engagement, wherein a stress distribution due to the first engagement is greater than a stress distribution due to the second engagement.

17. The manufacturing method of claim 16, further comprising connecting a center bridge between the front frame and the rear frame assembly.

18. The manufacturing method of claim 16, wherein the front suspension is an independent suspension, and the rear suspension is a rigid axle.

19. The manufacturing method of claim 16, further comprising a plate-shaped forklift mounting guide in a lower end portion of the battery carrier frame, the forklift mounting guide extending in a width direction of the battery carrier frame.

20. The manufacturing method of claim 16, wherein manufacturing the front frame comprises manufacturing a front frame that includes a front suspension mounting portion on which the front suspension is mounted and an air tank mounting portion formed on the front frame and configured to allow an air tank to be mounted above the front frame.

* * * * *